United States Patent Office

3,778,398
Patented Dec. 11, 1973

3,778,398
PARAFFIN WAX COATING COMPOSITIONS
Thomas S. Mestetsky, Easton, Pa., assignor to
GAF Corporation, New York, N.Y.
No Drawing. Filed June 8, 1972, Ser. No. 260,856
Int. Cl. C08f 45/52
U.S. Cl. 260—28.5 R                         18 Claims

ABSTRACT OF THE DISCLOSURE

A copolymer of vinyl ester and vinyl pyrrolidone is incorporated into paraffin wax, alone or in conjunction with the incorporation therein of a copolymer of ethylene and vinyl acetate to provide a blended paraffin wax composition having enhanced scuff resistance and/or grease resistance and/or slip characteristics. The vinyl pyrrolidone content of the copolymer of vinyl ester and said vinyl pyrrolidone is from about 10% to about 70% by weight, based on the total weight of said copolymer. At least about 5% by weight of said copolymer of vinyl ester and vinyl pyrrolidone is employed based on the total weight of said wax composition, the amount of said copolymer employed ranging up to about 75% by weight when said copolymer is employed alone and up to about 50% by weight when said copolymer is employed in conjunction with said copolymer of ethylene and vinyl acetate.

BACKGROUND OF THE INVENTION

Field of the invention

The present invention relates to improved paraffin wax coatings. More particularly, it relates to paraffin coatings having enhanced functional properties.

Description of the prior art

Paraffin wax employed as a coating composition paper and paperboard form a convenient and inexpensive surface coating providing desirable protection in packaging and wrapping applications. Such paraffin wax coatings are not, however, without certain drawbacks or limitations that adversely effect the degree of protection afforded the underlying surface in actual application under varying circumstances of use. As a result, paraffin wax coatings are commonly employed as formulations containing additives to improve the functional properties of the coatings. Thus, ethylene-vinyl acetate copolymers are in use as paraffin modifiers in order to improve paraffin coatings so as to render such coatings competitive with other forms of coatings, such as polyethylene extruded coatings. In addition, such paraffin coating compositions have been further modified by the addition of additives such as polystyrene and modified wood resins.

With such modifiers incorporated therein, paraffin wax coatings have gained considerable additional market place acceptance. Such paraffin coatings, however, are still encumbered by a number of practical deficiencies. Among such deficiencies are a sensitivity to scuff and to grease, a relatively high coefficient of friction, and poor hot tack. Paraffin wax formulations having improved characteristics with respect to one or more of these properties would represent a significant improvement in the art of paraffin wax coatings. Improvement in a combination of some or all of these properties would, of course, constitute a major advance, rendering paraffin coatings highly suitable for use in applications subject to severe conditions of wear in which paraffin coatings formulations presently available are subject to the disadvantages indicated above.

It is an object of the present invention, therefore, to provide improved paraffin wax formulations.

It is another object of the invention to provide paraffin wax formulations having improved functional properties.

It is another object of the invention to provide improved paraffin wax formulations having improved scuff resistance.

It is a further object of the invention to provide paraffin wax formulations having improved grease resistance.

It is a further object of the invention to provide paraffin wax formulations having improved slip characteristics.

It is a further object of the invention to provide paraffin wax formulations having improved hot tack characteristics.

It is a further object of the invention to provide paraffin wax formulations having an improved combination of scuff and grease resistance, slip and hot tack characteristics.

With these and other objects in mind, the invention is hereinafter described in detail, the novel features thereof being particularly pointed out in the appended claims.

SUMMARY OF THE INVENTION

The functional properties of paraffin wax coatings are improved, in the practice of the present invention, by the incorporation therein of a copolymer of vinyl ester, e.g. vinyl acetate, and vinyl pyrrolidone containing from about 10% to about 70% by weight vinyl pyrrolidone. This copolymer is employed in an amount constituting at least about 5% and preferably 25% by weight of the paraffin wax composition. When employed alone as the wax modifier, the copolymer is employed in amounts ranging up to about 75% by weight of the overall composition of paraffin wax and said copolymer additives. In paraffin wax formulations also incorporating an ethylene-vinyl acetate copolymer, the subject copolymer of vinyl acetate and vinyl pyrrolidone is employed in amounts ranging up to about 50% by weight. The paraffin wax formulations of the present invention have improved scuff and grease resistance, together with a desirable improvement in slip and hot tack characteristics.

DETAILED DESCRIPTION OF THE INVENTION

The desired improvement in the functional properties of paraffin wax formulations is accomplished by the incorporation therein of a copolymer of vinyl ester and vinyl pyrrolidone as herein provided in the practice of the present invention. Vinyl acetate is commonly employed, although it will be understood that other such vinyl esters of saturated aliphatic carboxylic acids, such as vinyl propionate, can be employed in place of part or all of the vinyl acetate in the vinyl ester-vinyl pyrrolidone copolymer.

The vinyl ester-vinyl pyrrolidone copolymer employed in the practice of the present invention is a known, commercially available material not heretofore employed for the purposes to which the present invention is directed. Thus, for example, vinyl acetate can be reacted with vinyl pyrrolidone to form the subject copolymer by techniques well known in the art. For example, 75 parts vinyl acetate, 25 parts vinyl pyrrolidone and 0.5 part azo catalyst can be agitated in benzene under nitrogen at 60° C. for 48 hours, with the resulting vinyl acetate-vinyl pyrrolidone copolymer being precipitated with hexane as disclosed in Table II, page 11, of Technical Bulletin 7543-037 of GAF Corporation. As disclosed therein, a suitable azo catalyst is azobisisobutyronitrile. Other suitable copolymerization catalysts include cumene hydroperoxide, cyclohexane peracetate, dibutyl peroxide and lauroyl peroxide. It will also be appreciated that such copolymers can be prepared with varying proportions of vinyl acetate and vinyl pyrrolidone as is well known in the art. For the purposes of the present invention, the subject copolymer of vinyl acetate or other related vinyl ester, and vinyl pyrrolidone will generally contain from about 10% to about 70% by weight vinyl pyrrolidone, based on the total weight of said copolymer of vinyl acetate and vinyl pyrrolidone. The vinyl acetate or other related vinyl ester content of the copolymer will, therefore, range generally from about 90% to about 30% by weight, based on the total weight of said copolymer. Illustrative copolymers thus suitable for use in the practice of the invention include copolymers having about 10%, about 50%, and about 70% by weight vinyl pyrrolidone, in addition to the specific copolymer referred to above, said percent by weight being based on the total weight of said copolymer.

Paraffin wax compositions having improved functional properties are prepared by blending the subject copolymer in paraffin wax so that the resulting blended paraffin wax composition will have said copolymer present in an amount of generally from about 5% to about 75% by weight based on the total weight of the resulting praffin wax composition, although it will be appreciated that the copolymer can be blended with the paraffin wax in any proportion within the general limits heretofore indicated.

In certain embodiments of the invention, the paraffin wax composition will also contain the ethylene-vinyl acetate copolymers heretofore proposed as modifiers for paraffin wax coatings. A typical commercially available ethylene-vinyl acetate copolymer is Du Pont Elvax 250 ethylene-vinyl acetate copolymer. When such an ethylene-vinyl acetate copolymer is incorporated in the paraffin wax composition of the present invention, it will be employed in an amount generally within the range of from about 25% to about 50% by weight based on the total weight of the blended paraffin wax comoposition of paraffin wax, ethylene-vinyl acetate copolymer and vinyl acetate-vinyl pyrrolidone copolymer. In such embodiments, the vinyl acetate-vinyl pyrrolidone copolymer employed will be incorporated into the blended paraffin wax composition in an amount generally within the range of from about 5% to about 50% by weight based on the total weight of said paraffin wax composition. It will be understood that, in any event, the amount of paraffin wax incorporated in the wax composition of the present invention will generally constitute at least about 25% by weight based on the total weight of the overall composition. It will be also understood that it is within the scope of the present invention to employ other known paraffin wax modifiers in amounts generally within the scope of the art to achieve either a further overall improvement in the functional properties of the paraffin wax composition or to enhance specific properties or characteristics of such compositions. The point of novelty of the present invention is not directed to such conventional paraffin wax modifiers, but to the incorporation of the subject vinyl ester-vinyl pyrrolidone copolymer in paraffin wax compositions either independently or in combination with the ethylene-vinyl acetate modifiers and other known paraffin wax modifiers heretofore employed in the art.

The present invention provides paraffin wax compositions having a highly desirable overall improvement in functional properties rendering such compositions of particular value in applications susceptible to heavy or severe wear or conditions of use. The paraffin wax compositions of the present invention thus are characterized by enhanced slip and/or enhanced scuff resistance and/or by a highly desirable resistance to grease or oils. In addition, the present invention, in certain embodiments, provides an additional advantage in wax coating in the form of improved hot tack, i.e. the adhesion of molten heat sealed surfaces. Paraffin wax coatings, even with known modifiers, have generally had poor hot tack characteristics, as well as a sensitivity to scuff and grease, and a relatively high coefficient of friction as heretofore noted. In the practice of the present invention, these advantages are achieved in a convenient, practical manner, with the subject vinyl ester-vinyl pyrrolidone copolymer being readily blended with the paraffin wax to produce a wax formulation that can be applied either as hot melts with no solvent or as solution coatings. In the latter embodiments, the wax formulations are dissolved in conventional solvents, e.g. toluene. It is also within the scope of the present invention to employ the paraffin wax formulations of the invention in the form of emulsions in a suitable carrier vehicle.

The invention is hereinafter described with reference to certain specific examples thereof. These examples are presented to illustrate particular embodiments of the invention, and should not be construed as limiting the scope of the invention as set forth in the appended claims. In the illustrative examples, the proportions of the ingredients employed are expressed in parts by weight unless otherwise noted.

EXAMPLE I

Paraffin wax formulations were prepared by blending wax modifiers with a 140° AMP paraffin wax of Mobil Oil Corporation. In one such formulation, the paraffin wax was blended with Elvax 250, a Du Pont ethylene vinyl acetate copolymer, said copolymer constituting 30% by weight of the total blend of copolymer and paraffin wax. Three other formulations were prepared with said paraffin wax and, in accordance with the present invention, a vinyl acetate-vinyl pyrrolidone copolymer, said copolymer being employed in amounts constituting 25%, 50% and 75% by weight, respectively, in said three wax formulations based on the total weight of the wax formulation. The vinyl acetate-vinyl pyrrolidone copolymer employed was Kolima 10, a vinyl acetate-vinyl pyrrolidone copolymer of GAF Corporation, containing 90% vinyl acetate and 10% vinyl pyrrolidone. Each of the four formulations thus produced were dissolved in toluene to form a 20% by weight solids solution. The resulting formulation solutions, as well as an unmodified wax coating, were coated on a 25 lb./3,000 ft.$^2$ cereal liner glassine, using a wire wound rod, to produce a coating having a coating weight of 5 lb./3,000 ft.$^2$. The coatings were oven dried at 120° C. Scuff resistance was determined and rated by comparative fingernail scratching of the coated surface with appropriate notation of the amount and quality of the disruption caused by such scraping of the coated surface. The coefficient of friction of each of the paraffin wax coatings was determined by pressing together two such coated surfaces, under moderate finger pressure, with the slip characteristics or coefficient of friction, being rated by trained personnel on a comparative, qualitative basis. Hot tack was rated by noting the amount of fiber tear when the coating was heat sealed at 55 p.s.i., 0.5 sec., and 300° F. on a Sentinal heat sealer, and subsequently pulled apart instantaneously on the separating jaws thereof.

In such tests, the unmodified wax coating and the ethylene-vinyl acetate copolymer modified wax formulation were both determined to have a poor scuff resistance, a high coefficient of friction and essentially no hot tack capability. By comparison, the formulations of the present invention exhibited a highly desirable overall improvement in such functional characteristics. Thus, the scuff resistance of the three formulations of the present invention was each rated at least fair compared with the poor scuff resistance of the paraffin wax unmodified and with conventional modifier as indicated above. The formulation of 50% of said Kolima 10 copolymer and 50% paraffin was produced good scuff resistance in such comparative tests. Whereas the coefficient of friction of the blend containing 25% Kolima 10 modifier was undersirably high, the coefficient of friction was found to decrease as the amount of wax modifier was increased, said coefficient of friction being moderate at a 50% modifier content and desirably low at 75% by weight Kolima 10 content based on the total weight of the formulation or coating. The hot tack characteristics of the formulations of the present invention, on the other hand, exhibited a different pattern, with essentially no hot tack ability being found at said 75% Kolima 10 content, but with fiber tearing hot tack using a formulation having 50% of said vinyl acetate-vinyl pyrrolidone copolymer. At a copolymer content of 25% by weight, the hot tack was relatively poor, although constituting an improvement over the hot tack characteristics of the wax coating containing the ethylene-vinyl acetate modifier and unmodified paraffin wax coatings. It will be appreciated, therefore, that the formulations in accordance with the present invention had a desirable overall combination of properties representing a significant advantage over unmodified wax and over the modified wax formulation employing an ethylene-vinyl acetate copolymer, with improved scuff resistance being of particular, consistent advantage over the range of proportions tested.

EXAMPLE II

A similar set of comparative tests was run in accordance with the procedures of Example I utilizing three such formulations of the present invention but employing a different vinyl acetate-vinyl pyrrolidone copolymer. In these latter tests, a Kolima 35 copolymer product of GAF Corporation was employed, said copolymer containing 70% by weight vinyl acetate and 30% by weight vinyl pyrrolidone. Once again, copolymer modifier contents of 25%, 50% and 75% by weight were employed in the formulations representing embodiments of the present invention. In each instance, the resulting coatings were found to have fair scuff resistance, as compared with the poor scuff resistance of the paraffin wax alone or with the conventional ethylene-vinyl acetate modifier therein. The coefficient of friction was likewise determined to be only moderate for each of the coatings of the present invention as compared with the undesirably high coefficient of friction for both unmodified wax and the conventionally modified wax. At 25%, 50% and 75% Kolima 35 contents by weight, a desirable fiber tearing hot tack was observed. As previously indicated, unmodified paraffin wax and wax containing the conventional modifier both had no hot tack capability.

EXAMPLE III

Even more striking improvements were obtained in scuff resistance and coefficient of friction characteristics by use of wax formulations containing either Kolima 10 or Kolima 35 copolymers together with said ethylene-vinyl acetate copolymer referred to in Example I. In this series of comparative tests, carried out as set forth in said Example I, six formulations representing embodiments of the present invention were compared with the previously mentioned untreated wax and with said wax modified by the incorporation therein of 30% by weight Elvax 250, ethylene-vinyl acetate copolymer. In one group of three formulations, Kolima 10 copolymer, ethylene-vinyl acetate copolymer and paraffin wax were blended to give respective proportions thereof by weight based on the total formulation weight, as follows: (1) 25%, 25% and 50%; (2) 25%, 50% and 25%; and (3) 50%, 25% and 25%. In a second group of three formulations, Kolima 35 copolymer, ethylene-vinyl acetate copolymer and paraffin wax were blended to likewise give the respective proportions set forth above. Each of the six wax formulations thus prepared provided coatings having excellent scuff resistance properties. As noted above with respect to Example I, unmodified paraffin wax and wax modified with ethylene-vinyl acetate copolymer alone had poor scuff resistance. In addition, the three formulations incorporating Kolima 10 copolymer each had a very low coefficient of friction, highly desirable in wax coatings, while the three formulations having Kolima 35 therein each had a desirabel low coefficient of friction. At a 50% by weight proportion of said Kolima 35 copolymer, a fiber tearing hot tack was achieved in addition to the very advantageous combination of excellent scuff resistance and low coefficient of friction.

EXAMPLE IV

Paraffin wax formulations were also blended using the paraffin wax referred to in Example I with the formulations being dissolved in toluene to form a coating solution containing 10% by weight of said wax formulation. The coatings were coated on a multi-ply cylinder machine cardboard at approximately 4 lbs./3,000 ft.$^2$, the coatings being oven dried at 120° C. One such coating was prepared using a wax formulation containing 30% by weight Elvax 250 ethylene-vinyl acetate copolymer and 70% by weight paraffin wax. A second coating employed a wax formulation having equal parts by weight of said paraffin wax, said Elvax 250 ethylene-vinyl acetate copolymer and a vinyl pyrrolidone-vinyl acetate copolymer having a vinyl pyrrolidone content of 10% by weight of said copolymer. A third coating employed a wax formulation containing equal parts by weight of said wax, said ethylene-vinyl acetate copolymer and a vinyl acetate-vinyl pyrrolidone copolymer having a vinyl pyrrolidone content of 50% by weight of said copolymer. As in the previous examples, the ethylene-vinyl acetate modified wax coating exhibited poor scuff resistance and had a high coefficient of friction, whereas said second and third formulations, falling within the scope of the invention, both exhibited good scuff resistance and had a desired very low coefficient of friction, with that incorporating said Kolima 35 copolymer having very good scuff resistance. All three formulations were also tested for grease resistance in a corn oil resistance test in which samples of coated cardboard were placed coating side up in a gravity draft oven at 40° C. A drop of corn oil was placed on each of said coated surfaces. The time required for the oil to penetrate the coating and discolor the surface of the board was noted. Whereas the coating employing the first said formulation had a corn oil resistance of approximately one hour, the coatings prepared with the second and third formulations were both found to have a corn oil resistance in excess of 200 hours.

EXAMPLE V

Hot melts with no carrier solvent were prepared using the paraffin wax and modifiers specified in Example I and were applied at a 1 mil thickness on a 42 lb./3,000 ft.$^2$ bond type white kraft paper. Whereas the formulation containing 30% ethylene-vinyl acetate and 70% paraffin wax by weight had, once again, a high coefficient of friction and poor scuff resistance, a highly desired low coefficient of friction was achieved with formulations containing said 30% by weight ethylene-vinyl acetate modifier together with as little as 5% by weight of hot melt coating of a vinyl acetate-vinyl pyrrolidone copolymer having a vinyl pyrrolidone content of 10% by weight of said copolymer. At said 5% and at 10% and 20% vinyl acetate-vinyl pyrrolidone copolymer contents, however, the scuff resistance of the hot melt coatings remained poor. As the amount of said vinyl acetate-vinyl pyrrolidone copolymer was increased to about 25% by weight or more, specifically 30% by weight, good scuff resistance properties were observed in the resulting coating, the ethylene-vinyl acetate being held at said 30% by weight based on the total weight of hot melt coating. A similar effect was observed in a series of four hot melt coatings prepared as above utilizing a vinyl acetate-vinyl pyrrolidone copolymer containing 30% by weight vinyl pyrrolidone based on the total weight of copolymer.

Wax coatings prepared with the novel wax formulations of the present invention, therefore, have a highly desirable combination of enhanced functional properties. These enhanced properties, including very significant scuff resistance improvement and slip characteristics, together with enhanced grease resistance, render such coatings of considerably greater practical value and desirability in coating applications, particularly those in which the coatings are to be subjected to severe conditions of wear and exposure. The improved hot tack achieved in particular embodiments of the invention provide a further overall advantage in the utilization of paraffin wax compositions as disclosed and claimed herein falling within the scope of the invention.

Therefore, I claim:

1. A blended paraffin wax composition having enhanced functional properties, including improved scuff and grease resistance, comprising:
   (a) paraffin wax; and
   (b) a modifier consisting of a saturated aliphatic carboxylic acid vinyl ester-vinyl pyrrolidone copolymer consisting of from about 10% to about 70% by weight vinyl pyrrolidone, and from about 90% to about 30% by weight of said vinyl ester, based on the total weight of said copolymer, said copolymer being incorporated in the paraffin wax in an amount within the range of from about 5% to about 75% by weight, based on the total weight of the paraffin wax-copolymer composition.

2. The composition of claim 1 in which said vinyl ester is vinyl acetate.

3. The composition of claim 2 in which the amount of copolymer in said composition is about 25% by weight.

4. The composition of claim 2 in which the amount of copolymer in said composition is about 50% by weight.

5. The composition of claim 2 in which the amount of copolymer in said composition is about 75% by weight.

6. The composition of claim 2 in which the copolymer has a vinyl pyrrolidone content of about 10% by weight.

7. The composition of claim 1 in which the copolymer has a vinyl pyrrolidone content of about 30% by weight.

8. The composition of claim 2 in which the copolymer has a vinyl pyrrolidone content of about 50% by weight.

9. The composition of claim 2 in which the copolymer has a vinyl pyrrolidone content of about 70% by weight.

10. A blended paraffin wax composition having enhanced functional properties, including improved scuff and grease resistance, comprising:
    (a) paraffin wax constituting at least about 25% by weight based on the total weight of said wax composition;
    (b) an ethylene-vinyl ester copolymer, said copolymer being present in an amount within the range of from about 25% to about 50% by weight, based on the total weight of said wax composition; and
    (c) a modifier consisting of a saturated aliphatic carboxylic acid vinyl ester-vinyl pyrrolidone copolymer containing from about 10% to about 70% by weight vinyl pyrrolidone, and from about 90% to about 30% by weight of said vinyl ester, based on the total weight of said copolymer, said copolymer being present in an amount within the range of from about 5% to about 50% by weight, based on the total weight of said wax composition.

11. The composition of claim 10 in which said vinyl ester comprises vinyl acetate.

12. The composition of claim 11 in which said paraffin wax, said ethylene-vinyl acetate copolymer, and said vinyl acetate-vinyl pyrrolidone copolymer are present in respective amounts of about 25%, 25%, and 50% by weight, based on the total weight of said wax composition.

13. The composition of claim 12 in which said paraffin wax, said ethylene-vinyl acetate copolymer and said vinyl acetate-vinyl pyrrolidone copolymer are present in respective amounts of about 25%, 50%, and 25% by weight, based on the total weight of said wax composition.

14. The composition of claim 11 in which said paraffin wax, said ethylene-vinyl acetate copolymer, said said vinyl acetate-vinyl pyrrolidone copolymer are present in about equal proportions by weight.

15. The composition of claim 11 in which vinyl pyrrolidone comprises about 10% by weight, based on the total weight of said copolymer of vinyl acetate and vinyl pyrrolidone.

16. The composition of claim 11 in which said vinyl pyrrolidone comprises about 30% by weight, based on the total weight of said copolymer of vinyl acetate and vinyl pyrrolidone.

17. The composition of claim 11 in which said vinyl pyrrolidone comprises about 50% by weight, based on the total weight of said copolymer of vinyl acetate and vinyl pyrrolidone.

18. The composition of claim 11 in which said vinyl pyrrolidone comprises about 70% by weight, based on the total weight of said copolymer of vinyl acetate and vinyl pyrrolidone.

References Cited
UNITED STATES PATENTS

| | | | |
|---|---|---|---|
| 3,006,900 | 10/1961 | Fikentscher | 260—28.5 R |
| 3,427,296 | 2/1969 | Anspon | 260—28.5 R |

ALLAN LIEBERMAN, Primary Examiner

P. R. MILCHŁ, Assistant Examiner

U.S. Cl. X.R.

260—28.5 AV, 895